United States Patent
Shrestha et al.

(10) Patent No.: US 11,550,285 B1
(45) Date of Patent: Jan. 10, 2023

(54) SYSTEMS AND METHODS FOR ENABLING A MAINTENANCE MODE OF PROTECTION DEVICES IN DIGITAL SECONDARY SYSTEMS

(71) Applicant: Schweitzer Engineering Laboratories, Inc., Pullman, WA (US)

(72) Inventors: Arun Shrestha, Charlotte, NC (US); Karen S J Wyszczelski, Holland, MI (US); Priyanka Nadkar, Charlotte, NC (US); Bharat Nalla, Pullman, WA (US); Sathish Kumar Mutha, Charlotte, NC (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/363,529

(22) Filed: Jun. 30, 2021

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
None
See application file for complete search history.

(56) References Cited

U.S. PATENT DOCUMENTS

| | | | |
|---|---|---|---|
| 5,191,520 A * | 3/1993 | Eckersley | H03K 17/08146 363/72 |
| 6,694,271 B1 * | 2/2004 | Hannon | H02H 7/261 702/58 |
| 7,373,222 B1 * | 5/2008 | Wright | H02J 3/14 700/20 |
| 7,729,276 B2 | 6/2010 | Akyol | |
| 9,450,407 B2 * | 9/2016 | Kulathu | H02H 3/033 |
| 10,012,681 B2 | 7/2018 | Wimmer | |
| 10,205,647 B2 | 2/2019 | Yang | |

(Continued)

FOREIGN PATENT DOCUMENTS

| | | | | |
|---|---|---|---|---|
| CA | 2604080 A1 * | 7/2007 | | |
| CN | 100401647 C * | 7/2008 | | H04W 52/50 |

OTHER PUBLICATIONS

Vizimax, Analog Merging Unit—AMU, 2019. retrieved from https://www.vizimax.com/products-services/merging-units.

(Continued)

*Primary Examiner* — Jason Lin
(74) *Attorney, Agent, or Firm* — Fletcher Yoder, P.C.

(57) ABSTRACT

Systems, methods, and devices are provided for determining a maintenance mode of one or more merging units of an electric power delivery system using an intelligent electronic device that may rely on communication from wired (or wireless) electrical measurement devices. The intelligent electronic device may be a line relay. The merging units may provide data to the line relay including at least one bit indicating a maintenance mode of each merging unit. If a maintenance mode bit from a particular merging unit indicates that the merging unit is in the maintenance mode, logic of the line relay may determine if a maintenance mode override is received. If so, the line relay may disregard the maintenance mode bit and process the data from the merging unit. If the logic determines that the merging unit is in the maintenance mode, the line relay may force data from the merging unit to zero.

20 Claims, 7 Drawing Sheets

(56) References Cited

U.S. PATENT DOCUMENTS

| | | | |
|---|---|---|---|
| 10,379,991 B2 | 8/2019 | Yang | |
| 10,782,328 B2* | 9/2020 | Abubakari | G01R 35/005 |
| 10,859,611 B2 | 12/2020 | Yang | |
| 2002/0173927 A1* | 11/2002 | Vandiver | G01R 31/3272 |
| | | | 702/122 |
| 2003/0005375 A1* | 1/2003 | Krech, Jr. | G01R 31/31907 |
| | | | 714/724 |
| 2008/0127210 A1* | 5/2008 | Bosold | H04L 67/025 |
| | | | 719/313 |
| 2008/0183406 A1* | 7/2008 | Lee | G01R 19/2513 |
| | | | 702/58 |
| 2014/0104738 A1* | 4/2014 | Schweitzer, III | H02H 3/08 |
| | | | 361/87 |
| 2015/0002186 A1* | 1/2015 | Taft | H02H 3/042 |
| | | | 324/764.01 |
| 2019/0116183 A1 | 4/2019 | Hussain | |
| 2019/0173860 A1 | 6/2019 | Sankaran | |
| 2019/0342101 A1 | 11/2019 | Hayes | |
| 2020/0106719 A1 | 4/2020 | Acharya | |

OTHER PUBLICATIONS

GE Multilin Inc., L90 Line Current Differential System, Instruction Manual for Version 7.6x, Jun. 2017, Section 5.11.1.
ABB, Relion® 670 Series Transformer Protection RET670 Version 2.2 IEC, Application Manual, Mar. 2018, Section 24.12.1.1.
Yang, Qiaoyin; Keckalo, David; Dolezilek, David; Cenzon, Ed: "Testing IEC 61850 Merging Units" 44th Annual Western Protective Relay Conference, Oct. 2017.

* cited by examiner

SYSTEMS AND METHODS FOR ENABLING A MAINTENANCE MODE OF PROTECTION DEVICES IN DIGITAL SECONDARY SYSTEMS

BACKGROUND

This disclosure relates to controlling an electric power delivery system. More specifically, this disclosure relates to placing a component of the electric power delivery system in maintenance mode without interfering with operation of the delivery system.

Electric power delivery systems carry electrical power (e.g., electricity) from a transmission system to residential communities, factories, industrial areas, and other electricity consumers. Power transformers located in substations may be used to reduce high-voltages to low-voltages that can be distributed to the electricity consumers. Maintenance may be performed on equipment in the substation to ensure reliable, safe, and efficient operation. For example, some equipment in the substation may be subjected to wear over time and may be replaced. In some cases, some equipment may be tested to ensure proper operation. However, if the testing is not coordinated correctly, monitoring systems in the substation may interpret a testing mode as a failure or error in the equipment associated with the substation. In that case, the monitoring system could incorrectly shut down or interfere with operations of the substation.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION

Figure 1:
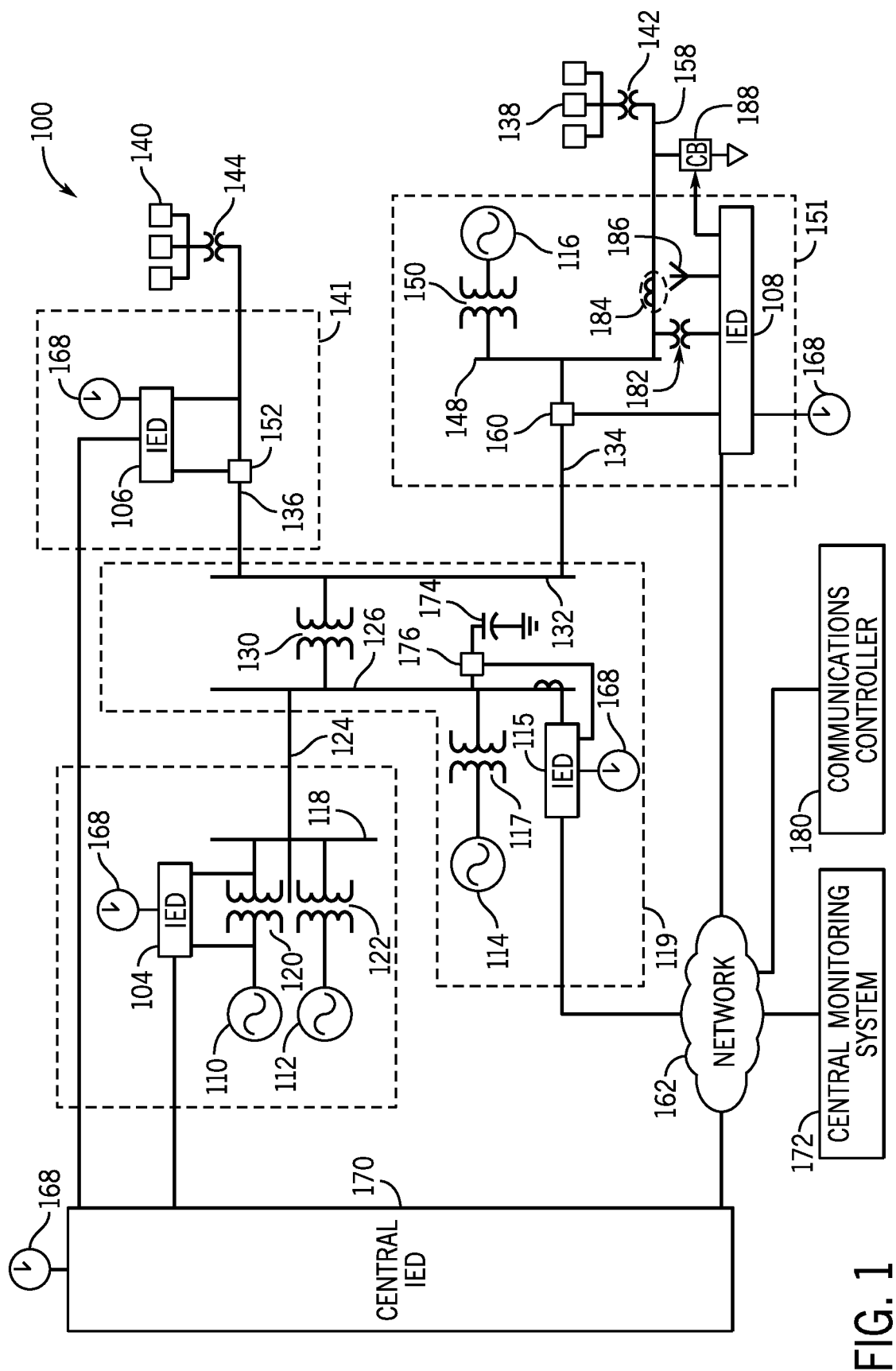
FIG. 1 is a simplified diagram of an electric power delivery system, in accordance with an embodiment of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

In addition, several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Thus, embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Digital monitoring systems may be used to monitor and/or control various aspects of an electric power delivery system and/or substation. For example, a digital monitoring system (e.g., digital secondary system) may be used to place a merging unit into a maintenance mode in order to perform testing or maintenance on a primary switchgear. In some cases, a maintenance mode of a merging unit may be used to perform testing and/or maintenance on various power system elements, such as a circuit breaker, a current transformer, a power transformer, a disconnect, and the like, coupled to the merging unit, or the merging unit itself. A merging unit may be used to monitor a component of the electric power delivery system and may obtain data related to a voltage, a current, a temperature, a power, a load of the respective component, a switchgear status, and the like.

When a switchgear associated with a merging unit or the merging unit itself undergoes testing, a relay coupled to the merging unit may still receive data from that merging unit. However, the data received from the merging unit may not be an accurate representation of a status of the delivery system or particular protection elements coupled to that merging unit. In some cases, inaccurate data interpreted by the relay may result in mis-operation of the relay and cause various protection elements to be taken off-line even though they are still needed. Thus, in some cases, the data received by the relay from the merging unit may indicate that the merging unit is in maintenance mode and the data should not be processed as providing an accurate representation of the upstream components.

Embodiments presented herein provide apparatus and techniques for indicating a maintenance mode of a merging unit coupled to protection devices of an electrical delivery system. In some cases, a maintenance mode of a merging unit may be indicated by software or hardware of the relay and/or merging unit. In some cases, data received by a relay from a merging unit may include an indication of a maintenance mode. In some cases, the relay may receive a separate indication (e.g., separate from the received data) that the merging unit is in maintenance mode. While a merging unit is in maintenance mode, a relay coupled thereto may disregard some or all data received from that merging unit. That is, the relay may use monitoring data from another (e.g., redundant) merging unit to monitor aspects of the electrical delivery system. In some cases, the relay may ignore or disregard all or a portion of the monitoring data received from a merging unit in maintenance mode by forcing one or more received data bits (and/or corresponding analog values) to zero.

In some embodiments, the relay may maintain a merging unit in maintenance mode even if the merging unit is removed (e.g., disconnected) from the relay. That is, the merging unit can no longer communicate with the relay. In that case, the relay may "see" the merging unit as being in maintenance mode and force the "received" data bits (and/or corresponding analog values) to zero. Without the merging unit being placed in a maintenance mode, the relay may consider the lack of communication as data loss and may block operation and/or performance of protection elements associated with that merging unit. That is, the maintenance mode of the merging unit (now disconnected) may enable the relay to maintain operation and/or monitoring of line protection elements even if an associated merging unit is temporarily taken out of service.

FIG. 1 illustrates a simplified diagram of an electric power delivery system 100, in accordance with an embodiment of the present disclosure. The electric power delivery system 100 may generate, transmit, and/or distribute electric energy to one or more loads. As illustrated, the electric power delivery system 100 includes electric generators 110, 112, 114, and 116. The electric power delivery system 100 may also include power transformers 117, 120, 122, 130, 142, 144, and 150. Furthermore, the electric power delivery system may include lines 124, 134, 136, and 158 to transmit and/or deliver power. Circuit breakers 152, 160, and 176 may be used control flow of power in the electric power delivery system 100. Busses 118, 126, 132, and 148 and/or loads 138 and 140 receive the power in and/or from (e.g., output by) the electric power delivery system 100. A variety of other types of equipment may also be included in electric power delivery system 100, such as current sensors (e.g., wireless current sensor (WCS) 184), potential transformers (e.g., potential transformer 182), voltage regulators, capacitors (e.g., capacitor 174) and/or capacitor banks (e.g., capacitor bank (CB) 188), antennas (e.g., antenna 186), and other suitable types of equipment useful in power generation, transmission, and/or distribution.

A substation 119 may include the electric generator 114, which may be a distributed generator, and which may be connected to the bus 126 through the power transformer 117 (e.g., a step-up transformer). The bus 126 may be connected to a distribution bus 132 via the power transformer 130 (e.g., a step-down transformer). Various distribution lines 136 and 134 may be connected to the distribution bus 132. The distribution line 136 may be connected to a substation 141 where the distribution line 136 is monitored and/or controlled using an intelligent electronic device (IED) 106, which may selectively open and close the circuit breaker 152. A load 140 may be fed from distribution line 136. The power transformer 144 (e.g., a step-down transformer), in communication with the distribution bus 132 via distribution line 136, may be used to step down a voltage for consumption by the load 140.

A distribution line 134 may deliver electric power to a bus 148 of the substation 151. The bus 148 may also receive electric power from a distributed generator 116 via transformer 150. The distribution line 158 may deliver electric power from the bus 148 to a load 138, and may include the power transformer 142 (e.g., a step-down transformer). A circuit breaker 160 may be used to selectively connect the bus 148 to the distribution line 134. The IED 108 may be used to monitor and/or control the circuit breaker 160 as well as the distribution line 158.

The electric power delivery system 100 may be monitored, controlled, automated, and/or protected using IEDs such as the IEDs 104, 106, 108, 115, and 170, and a central monitoring system 172. In general, the IEDs in an electric power generation and transmission system may be used for protection, control, automation, and/or monitoring of equipment in the system. For example, the IEDs may be used to monitor equipment of many types, including electric transmission lines, electric distribution lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

As used herein, an TED (e.g., the IEDs 104, 106, 108, 115, and 170) may refer to any processing-based device that monitors, controls, automates, and/or protects monitored equipment within the electric power delivery system 100. Such devices may include, for example, remote terminal units, merging units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system including multiple IEDs. Moreover, an IED of this disclosure may use a non-transitory computer-readable medium (e.g., memory) that may store instructions that, when executed by a processor of the IED, cause the processor to perform processes or methods disclosed herein. Moreover, the IED may include a wireless communication system to receive and/or transmit wireless messages from a wireless electrical measurement device. The wireless communication system of the IED may be able to communicate with a wireless communication system of the wireless electrical measurement devices, and may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, universal mobile telecommunication system (UMTS), long term evolution (LTE), long term evolution license assisted access (LTE-LAA), fifth-generation (5G) cellular, and/or 5G New Radio (5G NR) cellular). In some cases, the IEDs may be located remote from the respective substation and provide data to the respective substation via a fiber-optic cable.

A common time signal may be distributed throughout the electric power delivery system 100. Utilizing a common time source 168 may ensure that IEDs have a synchronized time signal that can be used to generate time synchronized data, such as synchrophasors. In various embodiments, the IEDs 104, 106, 108, 115, and 170 may be coupled to a common time source(s) 168 and receive a common time signal. The common time signal may be distributed in the electric power delivery system 100 using a communications network 162 and/or using a common time source 168, such as a Global Navigation Satellite System ("GNSS"), or the like.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A central IED 170 may be in communication with the IEDs 104, 106, 108, and 115. The IEDs 104, 106, 108 and 115 may be located remote from the central IED 170, and may communicate over various media such as a direct communication from IED 106 or over the communications network 162. According to various embodiments, some IEDs may be in direct communication with other IEDs. For example, the IED 104 may be in direct communication with the central IED 170. Additionally or alternatively, some IEDs may be in communication via the communications network 162. For example, the IED 108 may be in communication with the central IED 170 via the communications network 162. In some embodiments, an IED may refer to a relay, a merging unit, or the like.

Communication via the communications network 162 may be facilitated by networking devices including, but not limited to, multiplexers, routers, hubs, gateways, firewalls, and/or switches. In some embodiments, the IEDs and the network devices may include physically distinct devices. In certain embodiments, the IEDs and/or the network devices may be composite devices that may be configured in a variety of ways to perform overlapping functions. The IEDs and the network devices may include multi-function hardware (e.g., processors, computer-readable storage media, communications interfaces, etc.) that may be utilized to perform a variety of tasks that pertain to network communications and/or to operation of equipment within the electric power delivery system 100.

A communications controller 180 may interface with equipment in the communications network 162 to create a software-defined network (SDN) that facilitates communication between the IEDs 104, 106, 108, 115, and 170 and the central monitoring system 172. In various embodiments, the communications controller 180 may interface with a control plane (not shown) in the communications network 162. Using the control plane, the communications controller 180 may direct the flow of data within the communications network 162.

The communications controller 180 may receive information from multiple devices in the communications network 162 regarding transmission of data. In embodiments in which the communications network 162 includes fiber optic communication links, the data collected by the communications controller 180 may include reflection characteristics, attenuation characteristics, signal-to-noise ratio characteristics, harmonic characteristics, packet loss statics, and the like. In embodiments in which the communications network 162 includes electrical communication links, the data collected by the communications controller 180 may include voltage measurements, signal-to-noise ratio characteristics, packet loss statics, and the like. In some embodiments, the communications network 162 may include both electrical and optical transmission media. The information collected by the communications controller 180 may be used to assess a likelihood of a failure, to generate information about precursors to a failure, and to identify a root cause of a failure. The communications controller 180 may associate information regarding a status of various communication devices and communication links to assess a likelihood of a failure. Such associations may be utilized to generate information about the precursors to a failure and/or to identify root cause(s) of a failure consistent with embodiments of the present disclosure.

Embodiments presented herein may identify an operation mode (e.g., normal operation, maintenance mode, and the like) of one or more of the IEDs 104, 106, 108, 115, and 170. If data values from an IED 104, 106, 108, 115, and 170 in maintenance mode are processed, the data values may result in an error or interference of the operation of the electric power delivery system 100 and/or one or more components thereof. Thus, data values from that IED 104, 106, 108, 115, and 170 in maintenance mode may be disregarded (e.g., ignored) by the central monitoring system 172 (or the central IED 170) such that those data values are not processed. In some embodiments, the data values from the merging unit may be forced to zero and thus no data is processed. In this way, monitoring an operation mode of the IEDS 104, 106, 108, 115, and 170 may reduce an occurrence of an error in the electric power delivery system 100 and thus improve and ensure accurate and efficient operation of the electric power delivery system 100.

Figure 2:
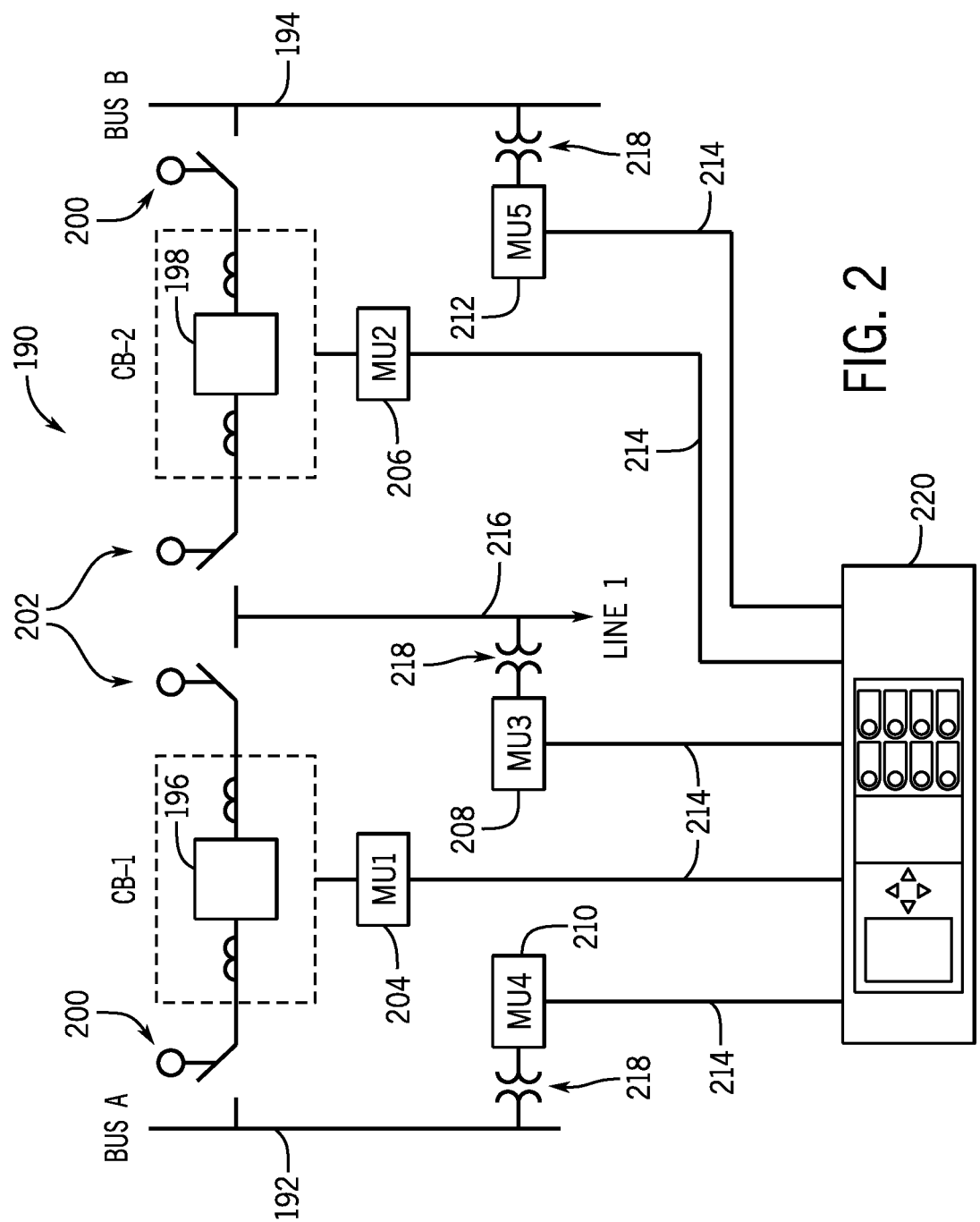
FIG. 2 is a block diagram of an example line relay connection in a digital monitoring system, in accordance with an embodiment of the present disclosure.

FIG. 2 is a block diagram of an example line relay connection 190 in a digital monitoring system, in accordance with an embodiment of the present disclosure. As shown, the example line relay connection 190 includes a bus 192 coupled to a circuit breaker 196 via a switch 200. A bus 194 is coupled to a circuit breaker 198 via a switch 200. A line 216 is coupled to the circuit breakers 196, 198 via switches 202. The line relay connection 190 includes various merging units (MUs) 204, 206, 208, 210, 212 to monitor and/or obtain data from various components including the circuit breakers 196, 198 and the busses 192, 194 or the line 216, and/or elements coupled thereto. For example, as illustrated, the merging unit 204 is coupled to the circuit breaker 196, the merging unit 206 is coupled to the circuit breaker 198, the merging unit 208 is coupled to the line 216 via a potential transformer 218, the merging unit 210 is coupled to the bus 192 via a potential transformer 218, and the merging unit 212 is coupled to the bus 194 via a potential transformer 218. Each of the merging units 204, 206, 208, 210, 212 are coupled to a relay 220 via a communication channel 214.

During operation, the switches 202 may be closed to couple the circuit breakers 196, 198 to the respective busses 192, 194. Similarly, at least one of the switches 202 may be closed to couple at least one of the circuit breakers 196, 198 to the line 216. The switches 200, 202 may be open if maintenance and/or testing is to be performed on a respective circuit breaker 196, 198. For example, if the circuit breaker 198 is to undergo maintenance, the respective switches 200, 202 may disconnect the circuit breaker 198 from the bus 194 and the line 216. That is, the switches 200, 202 may at least partially isolate the circuit breaker 198 to undergo maintenance from other elements of the relay connection 190.

The merging units 204, 206, 208, 210, 212 may transmit various data to the relay 220 via the communication channel 214. For example, the communication channel 214 may be used to transmit measured data from the merging units 204, 206, 208, 210, 212 to the relay 220. Each of the merging units 204, 206, 208, 210, 212 may be configured to receive and transmit communications using various protocols. For example, the merging units 204, 206, 208, 210, 212 may communication using at least one of IEC 61850 GOOSE protocol, IEC 61850 Sampled Values (SV) protocol, and any other suitable protocol for the merging units 204, 206, 208, 210, 212. It should be understood that the relay 220 is compatible with the communication protocols used by the merging units 204, 206, 208, 210, 212. The data transmitted from the merging units 204, 206, 208, 210, 212 to the relay 220 may include one or more bits that indicate an operation mode of the respective merging unit 204, 206, 208, 210, 212. For example, the merging units 204, 206, 208, 210, 212 may be in normal operation mode, maintenance mode, test mode, off, etc. The one or more bits may be used by the relay 220 to determine whether data received from a particular merging unit 204, 206, 208, 210, 212 can be processed and used to monitor associated equipment. That is, the relay 220 may receive data from each merging unit 204, 206, 208, 210, 212 regardless of an operation mode of the merging units 204, 206, 208, 210, 212.

If the merging unit 206 is disconnected from the relay 220 for maintenance of the circuit breaker 198 without notifying the relay 220 in some way, the relay 220 may disable line protection elements in the relay connection 190, such as distance protection, directional protection, and over-current protection. Various signals may be transmitted to the relay to reduce a likelihood of the relay 220 disabling the line protection elements of the relay connection 190. For example, while an item of equipment undergoes maintenance (e.g., the circuit breaker 198), the respective merging unit 206 may be placed into a maintenance mode. To do so, a mode of the merging unit 206 may be manually changed by an operator. In some cases, the mode of the merging unit 206 can be changed to the maintenance mode based on one or more connections and/or signals received by the merging unit 206. For example, if the merging unit 206 is disconnected from the circuit breaker 198, the merging unit 206 may automatically enter the maintenance mode.

If a particular merging unit 204, 206, 208, 210, 212 is in maintenance mode, the relay 220 may be programmed or configured to disregard all data from the merging unit 204, 206, 208, 210, 212. To do so, the relay 220 may force all data signals (and data) received from that merging unit 204, 206, 208, 210, 212 to zero, without causing an error or interference with the operation of other line protection elements of the line relay connection 190. That is, the relay 220 may receive the operation mode bit indicating the maintenance mode and force all subsequent bits in the received data to zero.

Figure 3:
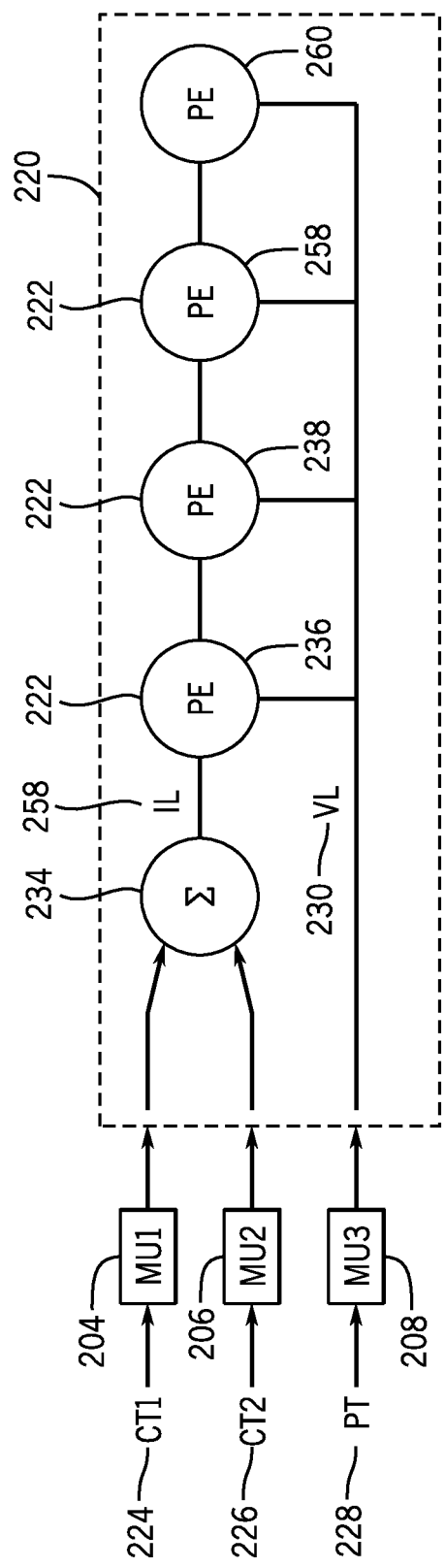
FIG. 3 is a block diagram of a line relay of FIG. 2 coupled to various merging units.

FIG. 3 is a block diagram of a line relay 220 discussed with respect to FIG. 2. As shown, the relay 220 is coupled to various merging units 204, 206, 208. The relay 220 includes protection elements 222 that may provide protection to the including distance protection 236, directional power detection 238, AC directional overcurrent protection 258, power swing detection/blocking 260, and the like. It should be understood that the protection elements 222 of the relay 220 are merely examples and that the relay 220 may include fewer, additional, and/or alternative protection elements 222.

The merging units 204, 206 may provide current values from current transformers 224, 226 to the relay 220. In some embodiments, the relay 220 may subscribe to the current values from the current transformers 224, 226 via the merging units 204, 206, such that the current values are received from the merging units 204, 206 at regular time intervals. The relay 220 may also receive a line voltage (LV) 230, measured via the merging unit 208.

The relay 220 sums the current values from the merging units 204, 206 via a summation component 234. In some embodiments, the summation component 234 may be a node coupling outputs of the merging units 204 and 206. Thus, the relay 220 computes the line current (IL) 258 via the summation component 234. The relay 220 may use the line voltage 230 and the line current 258 to execute the various protection elements 222.

The merging unit 204 may be turned off for maintenance of a corresponding current transformer 224, a corresponding circuit breaker, such as the circuit breaker 196 discussed with respect to FIG. 1, or the merging unit 204 itself. In that case, the relay 220 may declare a loss of communication with the merging unit 204 and all line protection elements 222 may be disabled. Even if the merging unit 204 is online and switched to a test mode (e.g., IEC 61850 Test, Test/Blocked, etc.) or an off mode, the relay 220 may disable the protection elements 222. To keep the protection elements 222 available when a merging unit (e.g., the merging units 204, 206, 208, 210, 212), a current transformer (e.g., the current transformers 224, 226), or a circuit breaker (e.g., the circuit breakers 196, 198) is under maintenance, a separate maintenance mode is needed to indicate that a primary equipment (e.g., corresponding to a merging unit 204, 206, 208, 210, 212) or a merging unit itself (e.g., the merging units 204, 206, 208, 210, 212) is under maintenance.

When a particular merging unit (e.g., the merging unit 204) is placed under maintenance mode, the line relay 220 may force the signals coming from that merging unit to zero. This allows the relay 220 to enable the protection elements 222 using other merging units (e.g., the merging units 206 and 208). In this way, the protection elements 222 are enabled even when a merging unit (e.g., the merging unit 204) is switched off or placed in maintenance mode.

Figure 4:
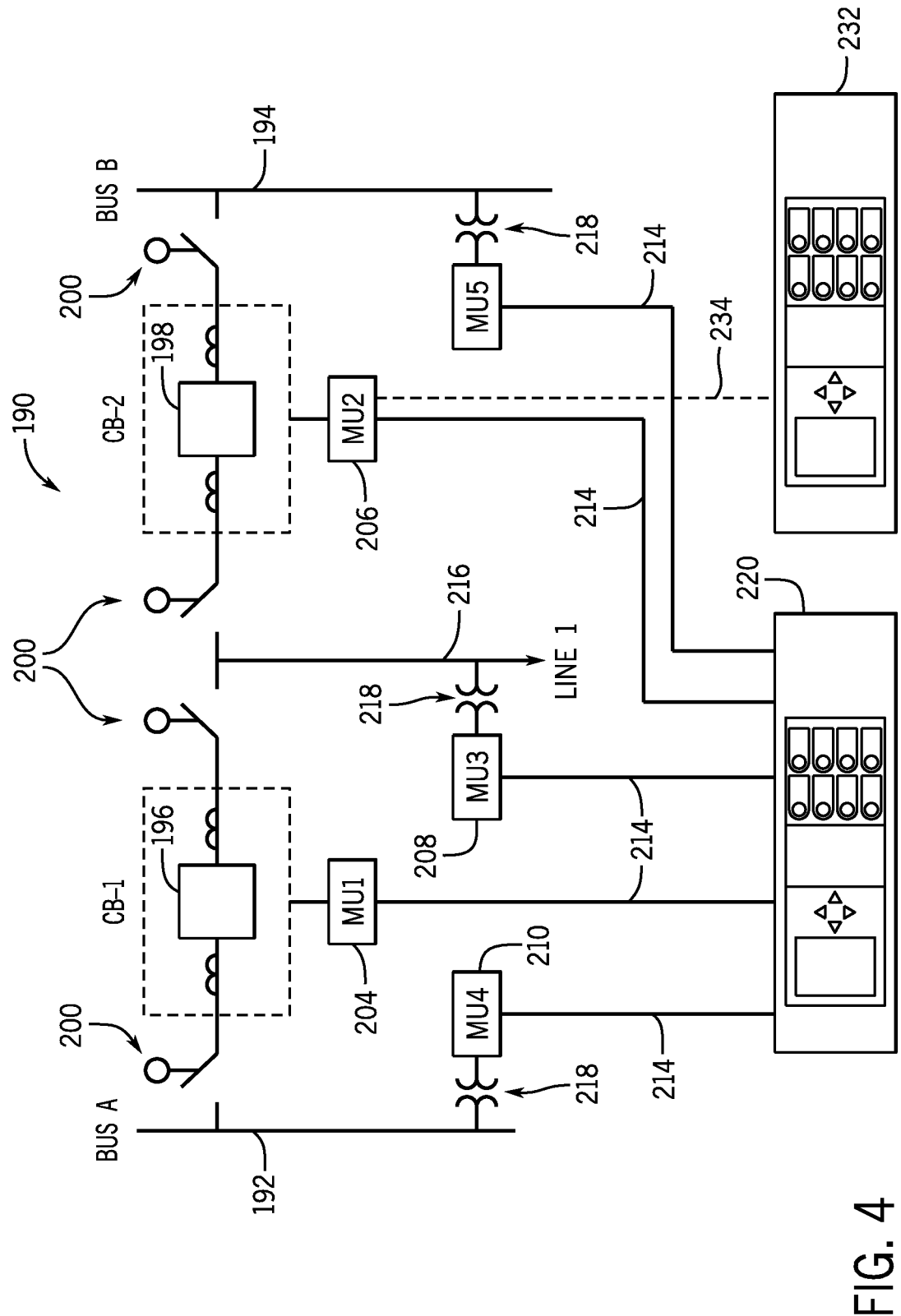
FIG. 4 is a block diagram of the example line relay connection of FIG. 2 with a testing relay, in accordance with an embodiment of the present disclosure.

FIG. 4 is a block diagram of the example line relay connection 190 of FIG. 2 with a testing relay 232 coupled to the merging unit 206 that is undergoing maintenance, in accordance with an embodiment of the present disclosure. As shown, the merging unit 206 undergoing maintenance is communicatively coupled to a testing relay 232. In some embodiments, the testing relay 232 may be substantially the same as the relay 220. In other embodiments, the testing relay 232 may be configured to perform testing on merging units placed in maintenance mode.

In some embodiments, the testing relay 232 is coupled to all merging units 204, 206, 208, 210, 212 of the line relay connection 190 and/or a corresponding substation. In other embodiments, the testing relay 232 is coupled to one or more merging units 204, 206, 208, 210, 212 as the merging units 204, 206, 208, 210, 212 are placed in maintenance mode. Thus, the testing relay 232 may only receive data from a merging unit 204, 206, 208, 210, 212 that is in maintenance mode.

The data received by the testing relay 232 may be the same data sent to the relay 220 from the merging units 204, 206, 208, 210, 212. Even though the operation mode bit indicates the merging unit is in the maintenance mode, the testing relay can disregard the operation mode bit and use the received data for testing and/or maintenance. In some cases, the data received from the merging unit can be used during maintenance to ensure proper operation of, for example, a newly installed or replaced circuit breaker 198. As discussed above, the operation mode bit enables the merging units 204, 206, 208, 210, 212 to remain in operation and provide data to the relay 220 without modification or isolation of the merging units 204, 206, 208, 210, 212 and the relay 220.

Figure 5:
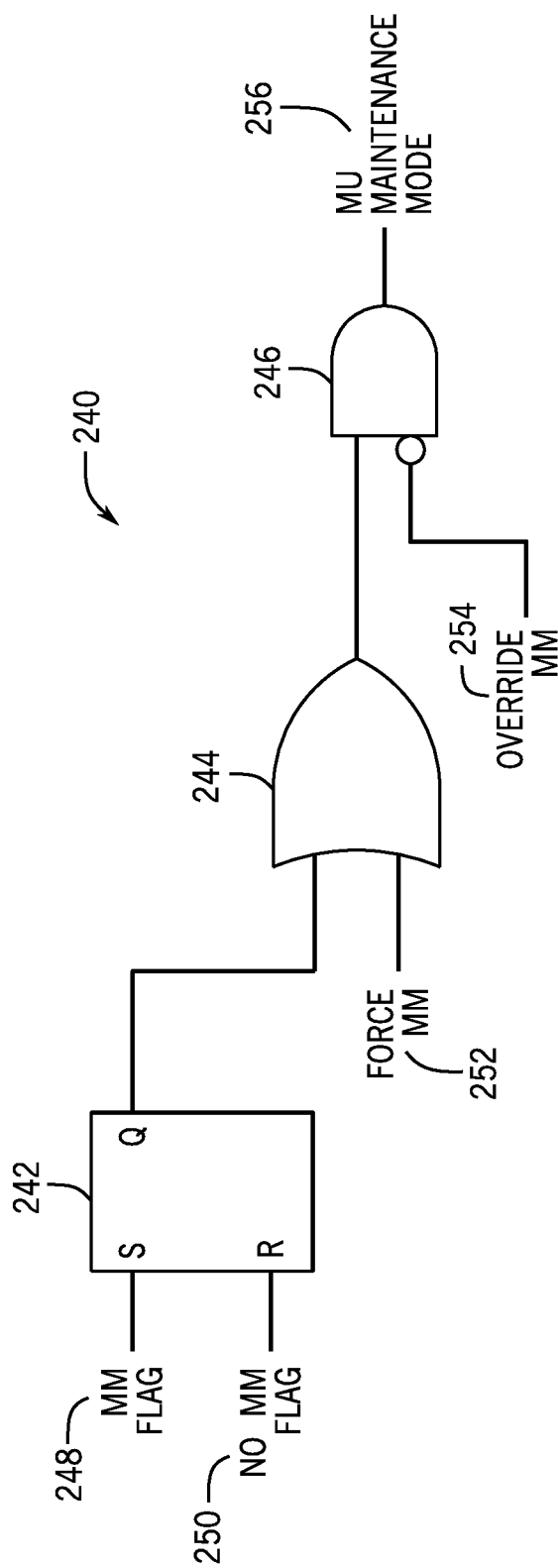
FIG. 5 is a logic diagram used to implement a maintenance mode in a digital monitoring system, in accordance with an embodiment of the present disclosure.

FIG. 5 is a logic diagram 240 used to implement a maintenance mode in a digital monitoring system, in accordance with an embodiment of the present disclosure. The logic diagram 240 may be representative of logic programmed into the relay 220 discussed with respect to FIGS. 2-4. For example, logic corresponding to the logic diagram 240 may be programmed and implemented via hardware, firmware, or software of the relay 220. As shown, the logic diagram 240 includes a set/reset (SR) latch 242, a OR gate 244, and an AND gate 246 with an inverted input. The SR latch 242 receives an indication of whether or not a maintenance mode (MM) flag (e.g., bit) is set (e.g., a logic high, 1) in data received from a merging unit. If the maintenance mode flag is set, an "MM flag" 248 input to the SR latch 242 is the logic high resulting in an output (e.g., Q) of the SR latch 242 being the logic high. If the maintenance mode is not set, a "No MM flag" 250 is the logic high resulting in the output (e.g., Q) being a logic low.

In some embodiments, the SR latch 242 may be disposed in the relay 220. Advantageously, the SR latch 242 enables the relay to detect a particular merging unit as being in maintenance mode even if the merging unit is removed or turned off. For example, to replace a merging unit, the merging unit may first indicate to the relay that the merging unit is in maintenance mode. Using an SR latch, the relay will maintain that merging unit in maintenance mode even if the relay loses connectivity with the merging unit due to replacement, or otherwise. In some cases, power to the particular merging unit may be turned off to maintenance and/or replacement of the merging unit or associated equipment.

The OR gate 244 receives a forced maintenance mode signal 252 indicating a forced maintenance mode of a merging unit. A merging unit may be forced into the maintenance mode if the merging unit fails and thus the maintenance bit in the data from the merging unit cannot be set. For example, if the merging unit is no longer operational (e.g., the merging unit needs to be installed or replaced, or a firmware of the merging unit needs to be updated and/or upgraded), no data can be sent from the merging to the relay 220. In that case, a forced maintenance mode may be implemented by the relay 220 based on the forced maintenance mode signal 252. If the merging unit is forced into maintenance mode, the forced maintenance mode signal 252 may be the logic high. If either or both the forced maintenance mode signal 252 or the output of the SR latch 242 is the logic high, an output of the OR gate 244 is the logic high.

The AND gate 246 receives the output of the OR gate 244 and a maintenance mode override signal 254. The maintenance mode override signal 254 supersedes (e.g., overrides) the maintenance mode flag 248 and the forced maintenance mode signal 252. The maintenance mode override signal 254 may be used to read the data values from a merging unit even if the merging unit is in maintenance mode (e.g., as indicated by the maintenance bit in the data received from the merging unit). As illustrated, the override signal 254 is inverted at the input of the AND gate 246. In this way, a maintenance mode output 256 of the AND gate 246 (and the logic 240) is a logic high if the output of the OR gate 244 is the logic high and the override is the logic low. That is, if the override signal 254 is the logic high, the maintenance mode output 256 is the logic low, indicating that the corresponding merging unit is not in the maintenance mode. Advantageously, the override signal 254 may be used during initial testing of a corresponding merging unit or to test a merging unit without affecting operation of a corresponding relay.

Figure 6:
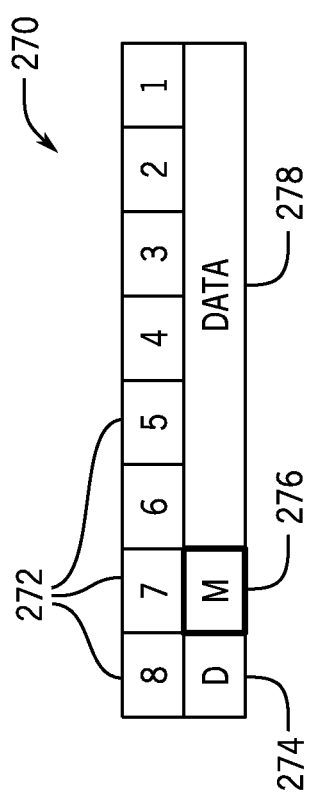
FIG. 6 is an example data format with a bit specifying a maintenance mode for a digital monitoring system, in accordance with an embodiment of the present disclosure.

FIG. 6 is an example data format 270 with a bit (or bits) 276 specifying a maintenance mode for a digital monitoring system, in accordance with an embodiment of the present disclosure. As illustrated, the data format 270 includes 8 bits 272 of a particular octet of the data received by the relay from a particular merging unit. Bits 1-6 278 may include a header or other type of data. As an example, the bits 278 may include data corresponding to measured values from a merging unit. Bit 7 276 may indicate a maintenance mode of the corresponding merging unit from which the data format 270 is received. That is, the bit 276 may indicate whether the corresponding merging unit is in the maintenance mode or not. If the bit 276 is the logic high value, the corresponding merging unit is in the maintenance mode. In some cases, bit 8 274 may indicate a header or type of data in the data format 270. In some cases, bit 8 274 may include additional data corresponding to the measured values from the merging unit. It should be understood that bit 7 276 is merely used as an example bit being used to indicate an operation mode of the corresponding merging unit, and that any combination (e.g., one or more) of the bits 272 may be used to indicate the operation mode of the merging unit.

Advantageously, using the bit (or bits) 276 to indicate a maintenance mode of the merging unit enables the relay to maintain consistent operation without delays or interruption. Further, using a bit 276 in the data from the merging unit can be applied to any suitable communication protocol between the merging unit and the relay, discussed with respect to FIGS. 2-4. That is, depending on the communication protocol, data from the merging unit may be compressed to enable one bit to indicate a maintenance mode of the merging unit. In some cases, a reserved bit may be used to indicate the maintenance mode of a corresponding merging unit.

Figure 7A:
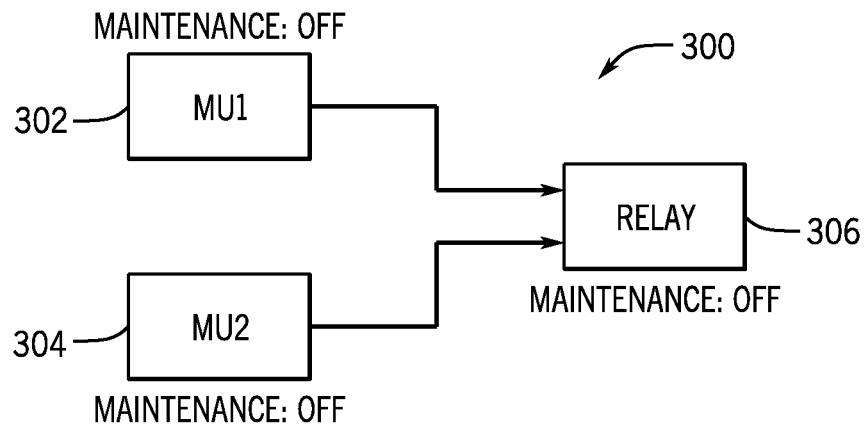
FIGS. 7A-7C are simplified block diagrams of relay inputs from merging units, in accordance with an embodiment of the present disclosure.
Figure 7B:
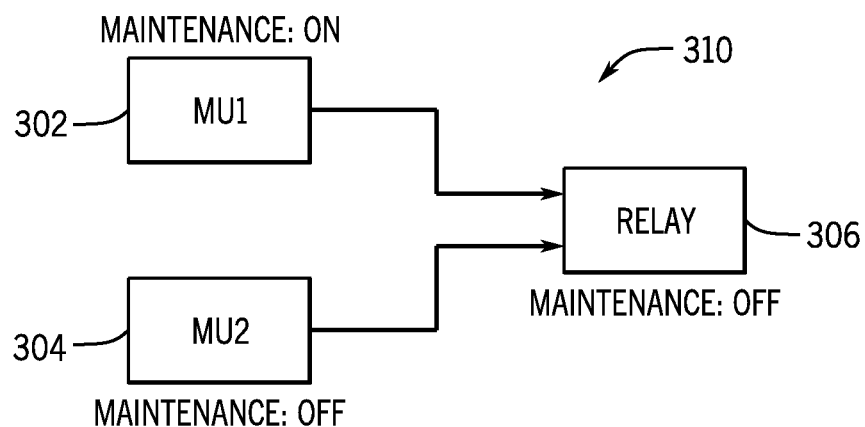
Figure 7C:
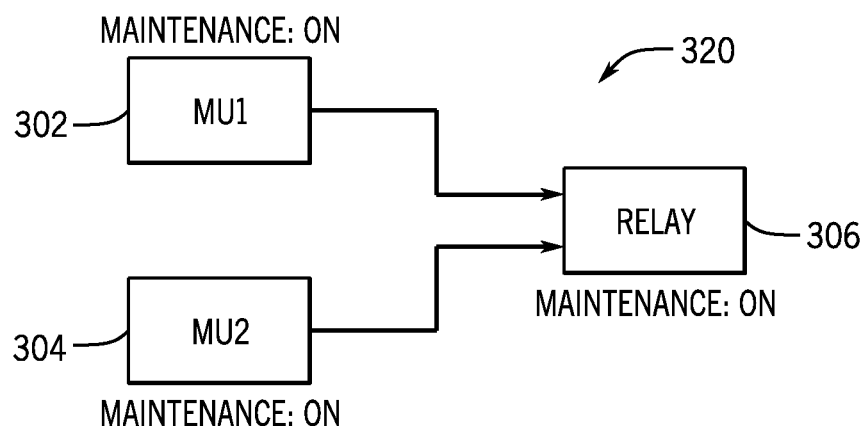

FIGS. 7A-7C are simplified block diagrams of relay inputs from merging units, in accordance with an embodiment of the present disclosure. FIG. 7A illustrates a block diagram of a line relay connection 300 of a first merging unit 302, a second merging unit 304, and a line relay 306. As shown, the merging units 302, 304 have a maintenance mode turned off. That is, the merging units 302, 304 are not in maintenance mode. In that case, the relay 306 will receive and process data from the merging units 302, 304 normally.

That is, the relay 306 does not disregard any data from the merging units 302, 304 based on the maintenance mode of the merging units 302, 304.

FIG. 7B illustrates a block diagram of a line relay connection 310 substantially similar to the connection 300 of FIG. 7A. However, in this case, the merging unit 302 is in the maintenance mode. That is, the maintenance mode bit in the data received by the relay 306 from the merging unit 302 may be a logic high to indicate the maintenance mode of the merging unit 302. Thus, the relay 306 may disregard (e.g., ignore) data from the merging unit 302 while it is in the maintenance mode. That is, in some embodiments, the relay 306 may force all data (e.g., bits) from the merging unit to be a value of zero, such that the merging unit remains operational and may maintain operation and functionality of at least one associated line protection element (e.g., distance protection, directional overcurrent protection, or the like). The merging unit 304 is not in the maintenance mode, and thus the relay will receive and process data from the merging unit 304 normally. Once the maintenance bit for the merging unit 302 goes to the logic low, the merging unit 302 is no longer in the maintenance mode and the relay 306 may resume receiving and processing data from the merging unit 302 normally.

FIG. 7C illustrates a block diagram of a line relay connection 320 substantially similar to the line relay connections 300, 310 that of FIGS. 7A and 7B. As illustrated, the merging units 302, 304 are both in maintenance mode. That is, the relay connection 320 may be representative of a case when all merging units communicatively coupled to the relay 306 are in maintenance mode. In this embodiment, as shown, the relay 306 is also in maintenance mode. That is, the relay 306 may enter into a relay maintenance mode if all merging units coupled thereto are in maintenance mode and a maintenance bit from each merging unit indicates such. That is, the relay 306 may disregard all data from all merging units. Further, the relay 306 in maintenance mode may not analyze the data or provide an output to be reviewed by, for example, an operator.

In some embodiments, the relay 306 in maintenance mode may be representative of the testing relay 232 discussed with respect to FIG. 4. That is, an operation mode of the testing relay 232, 306 may be maintenance mode as an indication that the relay is testing the data received from the corresponding merging units 302, 304.

Figure 8:
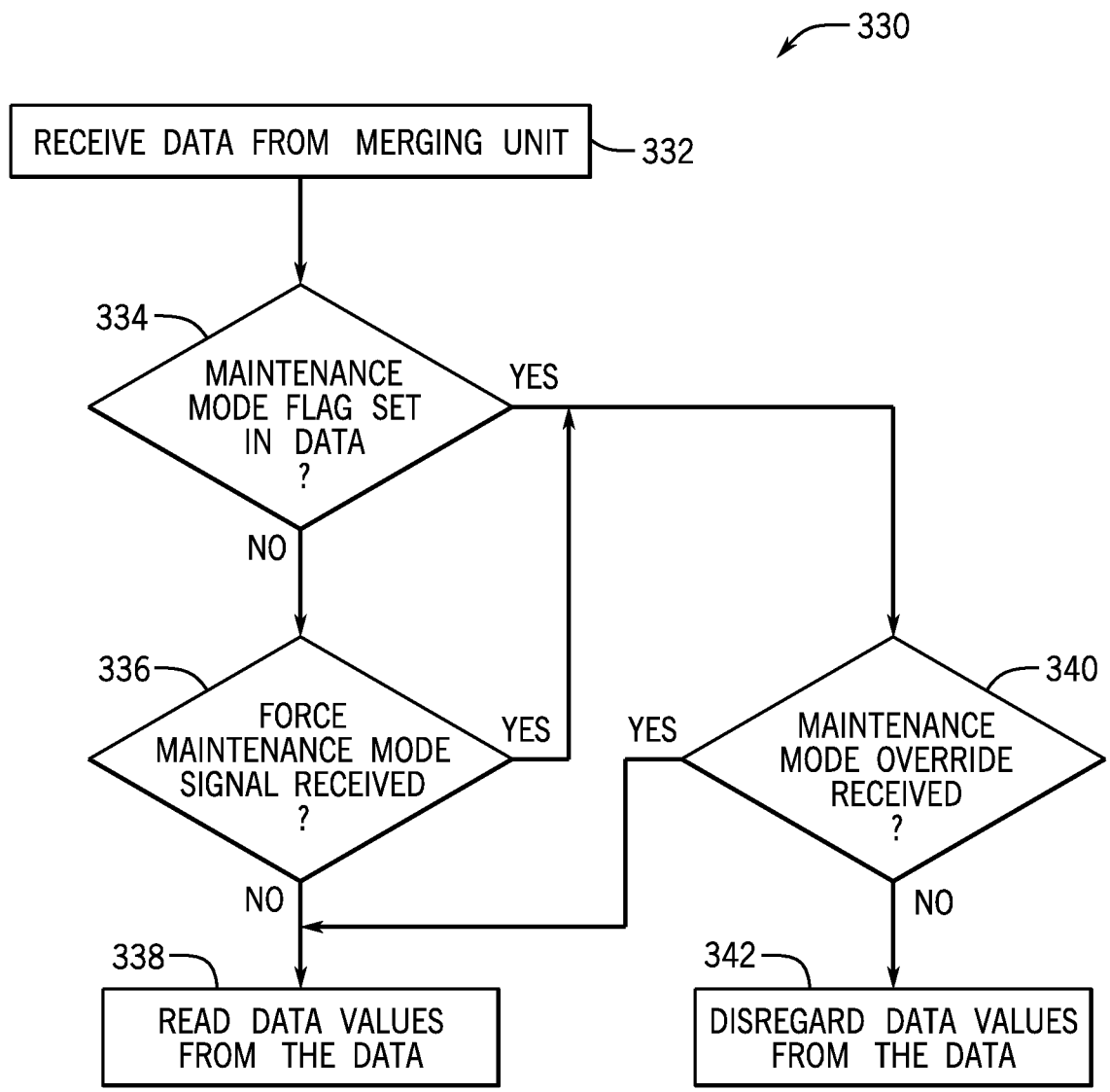
FIG. 8 is a flowchart of a process used by a relay to determine a maintenance mode of a merging unit coupled thereto, in accordance with an embodiment of the present disclosure.

FIG. 8 is a flowchart of a process 330 used by a relay to determine a maintenance mode merging unit coupled thereto, in accordance with an embodiment of the present disclosure. The process 330 may correspond to the logic 240 of FIG. 5 and may be performed by, for example, a processor and/or controller of the relay. The process 330 is discussed with respect to data received by the relay from a single merging unit. However, it should be understood that the process 330 can be applied to a number of merging units coupled to a relay to determine if one or more of the merging units are in maintenance mode.

The process 330 begins at operation 332 where the relay receives data from the merging unit. The data may include measured or sensed values from equipment (e.g., a circuit breaker) corresponding to the merging unit. At operation 334, the logic of the relay determines if the maintenance mode flag (e.g., bit) is set. For example, the logic may determine if a designated bit (e.g., a maintenance mode bit) in the data is a logic high to indicate a maintenance mode of the merging unit. If the maintenance mode bit is the logic high, the logic proceeds to operation 340, discussed in more detail below, to determine if a mode override is received. If the maintenance mode bit is logic low (e.g., indicating the merging unit is not in maintenance mode) at operation 334, the process 330 proceeds to operation 336.

At operation 336, the logic of the relay determines if a forced maintenance mode signal (e.g., bit) is received. As discussed above, the merging unit may be forced into maintenance mode if the merging unit fails and no data is received therefrom. Thus, the relay disregards the (expected) data as if the merging unit transmitted data to the relay that included a logic high maintenance mode bit. If the relay receives a forced maintenance mode signal at operation 336, the logic determines if a mode override signal is received at operation 340. As discussed above, a mode override may be used to read the data values from the merging unit even though the merging unit is maintenance mode based on the maintenance mode flag or the forced maintenance mode signal. If the logic determines that an override is not received, the relay treats the merging unit as being in maintenance mode and disregards the data from the merging unit at operation 342.

If the forced maintenance mode signal is not received at operation 336, or if a mode override is received at operation 340, the relay reads and processes the data from the merging unit at operation 338.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A line relay of an electric power delivery system comprising a controller configured to:
receive first data associated with a first intelligent electronic device of a plurality of intelligent electronic devices operating in the electric power delivery system, the first data comprising first data values and a first designated bit or bits, wherein the first designated bit or bits is indicative of an operation mode of the first intelligent electronic device;

determine the operation mode of the first intelligent electronic device based on the first designated bit or bits;

operate the plurality of intelligent electronic devices based on processing the first data values upon determining the first designated bit or bits indicates the operation mode of the first intelligent electronic device is not the maintenance mode; and operate remaining intelligent electronic devices of the plurality of the intelligent electronic devices based on disregarding the first data values upon determining that the operation mode of the first intelligent electronic device is a maintenance mode.

2. The line relay of claim 1, wherein the first designated bit or bits indicates the maintenance mode if the first designated bit is a logic high.

3. The line relay of claim 1, wherein the first data values include at least one of a voltage, a current, a temperature, a power, or a load of the first intelligent electronic device.

4. The line relay of claim 1, comprising a first protection element configured to receive the first data associated with the first intelligent electronic device.

5. The line relay of claim 4, wherein the first protection element comprises at least one of a distance protection, a directional power detection, an alternating current (AC) directional overcurrent protection, and a power swing detection.

6. The line relay of claim 4, wherein the controller is configured to:

receive second data associated with a second intelligent electronic device of the electric power delivery system, the second data comprising second data values and a second designated bit or bits, wherein the second designated bit or bits is indicative of an operation mode of the second intelligent electronic device;

determine the operation mode of the second intelligent electronic device based on the second designated bit or bits;

disregard the second data values upon determining that the operation mode of the second intelligent electronic device is a maintenance mode; and process the second data values upon determining the second designated bit or bits indicates the operation mode of the second intelligent electronic device is not the maintenance mode.

7. The line relay of claim 1, wherein the line relay is configured to receive the first data using IEC 61850 GOOSE protocol or IEC 61850 Sampled Values (SV) protocol.

8. The line relay of claim 1, wherein the first intelligent electronic device of the electric power delivery system comprises at least one of a remote terminal unit, a merging unit, differential relays, a distance relay, a directional relay, a feeder relay, an overcurrent relay, a voltage regulator control, a voltage relay, a breaker failure relay, a generator relay, a motor relay, an automation controller, a bay controller, a voltage meter, a current meter, a recloser control, a communications processor, a computing platform, a programmable logic controller (PLC), a programmable automation controller, and an input and output module.

9. A method comprising:

receiving, at a line relay of an electric power delivery system, first data comprising first data values and a first mode bit from a first merging unit operating in an electric power delivery system, wherein the first mode bit is indicative of an operation mode of the first merging unit;

receiving, at the line relay, second data comprising second data values and a second mode bit from a second merging unit operating in the electric power delivery system, wherein the second mode bit is indicative of an operation mode of the second merging unit;

determining, at the line relay, that the operation mode of the first merging unit is a maintenance mode based on the first mode bit;

determining, at the line relay, that the operation mode of the second merging unit is a normal operation mode based on the first mode bit;

disregard operations of the first merging unit by disregarding the first data values based on determining the maintenance mode or upon receiving a forced maintenance mode signal; and operate the second merging unit by processing the second data values based on determining the normal operation mode or upon receiving a mode override signal.

10. The method of claim 9, wherein the mode override signal supersedes the second mode bit and the forced maintenance mode signal.

11. The method of claim 9, wherein:

the first merging unit is configured to provide the first data based on monitoring a first component of the electric power delivery system; and the second merging unit is configured to provide the second data based on monitoring a second component of the electric power delivery system.

12. The method of claim 11, wherein the first component and the second component comprise at least one of a remote terminal unit, a merging unit, differential relays, a distance relay, a directional relay, a feeder relay, an overcurrent relay, a voltage regulator control, a voltage relay, a breaker failure relay, a generator relay, a motor relay, an automation controller, a bay controller, a voltage meter, a current meter, a recloser control, a communications processor, a computing platform, a programmable logic controller (PLC), a programmable automation controller, and an input and output module.

13. The method of claim 9, wherein the first mode bit indicates a maintenance mode if the first mode bit is a logic high and a normal operation mode if the first mode bit is a logic low.

14. The method of claim 9, wherein the first merging unit is coupled to a testing relay.

15. The method of claim 14, comprising processing, via the testing relay, the data values from the first merging unit having the first mode bit that is a logic high.

16. One or more tangible, non-transitory, computer-readable media comprising instructions that, when executed by a processor of a central monitoring system configured to control at least part of an electric power delivery system, cause the processor to:

receive data comprising data values from a number of intelligent electronic devices of the electric power delivery system;

determine whether a maintenance mode flag of at least a portion of the data associated with a first intelligent electronic device of the number of intelligent electronic devices is set;

operate the number of the intelligent electronic devices based on processing the data values of the data upon determining that the operation mode of the first intelligent electronic device is a normal operation mode or the central monitoring system receives a maintenance mode override signal; and operate remaining intelligent electronic devices of the number of the intelligent electronic devices based on disregarding the portion of the data upon determining that the operation mode of the first intelligent electronic device is a maintenance mode.

17. The one or more tangible, non-transitory, computer-readable media of claim 16, wherein the maintenance mode flag indicates that the first intelligent electronic device is in a maintenance mode.

18. The one or more tangible, non-transitory, computer-readable media of claim 16, wherein the central monitoring system comprises one of a supervisory control and data acquisition (SCADA) system and a wide area control and situational awareness (WACSA) system disposed in an electrical substation of the electric power delivery system.

19. The one or more tangible, non-transitory, computer-readable media of claim 16, wherein the data values include at least one of a voltage, a current, a temperature, a power, or a load of a respective component of the electric power delivery system.

20. The one or tangible, non-transitory, more computer-readable media of claim 16, wherein the maintenance mode override signal supersedes the maintenance mode flag and a forced maintenance mode signal.

* * * * *